United States Patent
Flood et al.

(10) Patent No.: US 7,539,837 B1
(45) Date of Patent: May 26, 2009

(54) METHOD AND APPARATUS FOR REDUCING REMEMBERED SET OVERHEAD IN A GENERATIONAL GARBAGE COLLECTOR BY CONSTRAINING COLLECTION SET CHOICE

(75) Inventors: Christine H. Flood, Westford, MA (US); David L. Detlefs, Westford, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 666 days.

(21) Appl. No.: 11/128,791

(22) Filed: May 13, 2005

(51) Int. Cl.
*G06F 12/00* (2006.01)
*G06F 13/00* (2006.01)
*G06F 13/28* (2006.01)
(52) U.S. Cl. .................. 711/170; 707/206
(58) Field of Classification Search ............... 707/206
See application file for complete search history.

(56) References Cited

U.S. PATENT DOCUMENTS

| | | | | |
|---|---|---|---|---|
| 5,485,613 | A * | 1/1996 | Engelstad et al. | 707/206 |
| 6,185,581 | B1 * | 2/2001 | Garthwaite | 707/206 |
| 6,286,016 | B1 * | 9/2001 | Heller et al. | 707/206 |
| 7,085,790 | B2 * | 8/2006 | Garthwaite | 707/206 |
| 7,293,051 | B1 * | 11/2007 | Printezis et al. | 707/206 |
| 7,340,494 | B1 * | 3/2008 | Detlefs et al. | 707/206 |
| 2002/0161792 | A1 * | 10/2002 | Garthwaite | 707/206 |

OTHER PUBLICATIONS

David Detlefs, et al, Garbage-First Garbage Collection, 2004, pp. 1-12, Vancouver, British Columbia, Canada.
Richard L. Hudson and J. Eliot B. Moss, Incremental Collection of Mature Objects, 1992, pp. 1-16.
Ori Ben-Yitzhak, et al., An Alogrithm for Parallel Incremental Compaction, ISMM '02, Jun. 20-21, 2002, Berlin, Germany, pp. 100-105.
Richard Jones and Rafael Lins, Garbage Collection Algorithms for Automatic Dynamic Memory Management, 1996, John Wiley & Sons, pp. 37-48.

* cited by examiner

*Primary Examiner*—Tuan V Thai
*Assistant Examiner*—Mark A Giardino, Jr.
(74) *Attorney, Agent, or Firm*—Osha • Liang LLP (57) ABSTRACT

A remembered set for a memory heap region in a garbage-collected computer system is modified to classify reference locations stored therein by the heap region from which the references originate so that the number of references originating from a given region can be easily determined. If the number of remembered set entries for references from a second region to a first region reaches a predetermined threshold, the second region is constrained so that it will be collected at the same time as, or before, the first region. Then, all entries in the remembered set associated with the first region for references from the second region to the first region can be deleted, and no such entries need be entered in the future thereby reducing the size of that remembered set and the time required to scan it.

23 Claims, 5 Drawing Sheets

METHOD AND APPARATUS FOR REDUCING REMEMBERED SET OVERHEAD IN A GENERATIONAL GARBAGE COLLECTOR BY CONSTRAINING COLLECTION SET CHOICE

BACKGROUND

This invention relates to automatic reclamation of allocated, but unused memory, or garbage, in a computer system that uses a space-incremental garbage collector to process an object space concurrently with the operation of non-collection threads. Memory reclamation may be carried out by a special-purpose garbage collection algorithm that locates and reclaims memory that is unused, but has not been explicitly de-allocated. There are many known garbage collection algorithms, including reference counting, mark-sweep, mark-compact and generational garbage collection algorithms. These, and other garbage collection techniques, are described in detail in a book entitled "Garbage Collection, Algorithms for Automatic Dynamic Memory Management" by Richard Jones and Raphael Lins, John Wiley & Sons, 1996.

However, many of the aforementioned garbage collection techniques often lead to long and unpredictable delays because normal processing must be suspended during the garbage collection process (called "stop the world" or STW processing) and these collectors at least occasionally scan the entire heap. The garbage collection process is performed by collection threads that perform collection work when all other threads are stopped. Non-collection threads perform tasks for the application. Therefore, they are generally not suitable in situations, such as real-time or interactive systems, where non-disruptive behavior is of greatest importance. Conventional generational collection techniques alleviate these delays somewhat by concentrating collection efforts on small memory areas, called "young" generations in which most of the activity occurs. This concentration reduces the need for collecting the remaining large memory area, called the "old" or "mature" generation and, thus, reduces the time consumed during garbage collection, but does not eliminate it.

When the mature generation is eventually collected, many generational techniques lead to pauses in normal operation that, while less frequent, are still highly disruptive. One approach to eliminate these long pauses is to apply a space-incremental technique to regions in the heap containing older objects. Space-incremental collection techniques allow a subset of objects in the heap to be collected and evacuated independently of the rest of the heap. A given subset consists of one or more possibly noncontiguous regions and forms the collection set. Examples of such techniques include the Train algorithm as described in "Incremental Collection of Mature Objects", R. L. Hudson, J. E. B. Moss, *Proceedings of the International Workshop on Memory Management*, volume 637 of *Lecture Notes in Computer Science, St. Malo, France*, pp 388-403, 1992, Springer-Verlag, London, Great Britain; the Garbage-first algorithm as described in "Garbage-First Garbage Collection", D. Detlefs, C. Flood, S. Heller, A. Printezis, *Proceedings of the 4th International Symposium on Memory Management*, pp 37-48, 2004 and other techniques allowing partial compaction of the heap as described in "An Algorithm for Parallel Incremental Compaction", O. Ben-Yitzhak, I. Goft, E. K. Kolodner, K. Kuiper, V. Leikehman, *Proceedings of the 3rd International Symposium on Memory Management*, pp 100-105, 2002.

As an example, the Train algorithm divides the genera-tion's memory into a number of fixed-sized regions, or car sections and orders the car sections. During at least some of the collection pauses, one or more of the cars lowest in the overall order are collected; these form the collection set. Using this ordering and careful placement policies, the algorithm allows the size of collection sets to be bounded to achieve acceptable pause times even as it guarantees that unreachable data structures too large to fit into a collection set will be isolated in single trains, and once there, reclaimed as a group. During the operation of the algorithm, objects in a car may be evacuated, or relocated, to other cars. When an object is relocated, references to that object located outside of the collection region must be changed to point to the new object location. To facilitate the step of finding the references to objects in a region, many space-incremental collectors use "remembered sets." In particular, a remembered set is associated with each region and tracks memory locations containing references that point to objects in that region. Memory locations are used instead of the references themselves for two reasons. First, if the referent moves, the referring pointers must be located so that they can be updated to point to the new location. Secondly, since remembered sets are built over time, when the time arrives to use the references they may be stale (no longer point to objects in a region associated with that remembered set). Remembered sets may be implemented with various data structures that can be used to represent a set, such as sets, bitmaps, hash tables and bags. In addition, different collection techniques may have different kinds of remembered sets. For example, generational collectors typically keep track of old generation to young generation references, but do not track young generation to old generation references. They either collect the smaller young generation as part of the collecting the old generation, or scan all its objects searching for such pointers. The Train-algorithm associates a remembered set with each region, identifying references into the region from locations outside the region.

When live objects are evacuated from regions in the collection set, the live objects are identified by finding references from outside the collection set into it. These references may come from root locations outside the heap, or from objects in regions outside the collection set. The remembered sets of the collection set regions enable the identification of pointers from elsewhere in the heap, so that live objects are identified and pointers to them are updated. In addition, the evacuated objects are scanned in their new locations and their references to objects in other regions or generations are duly recorded in the appropriate remembered sets or data structures.

Since non-collection threads are generally suspended during collection using space-incremental collectors, the collectors can still introduce considerable delays during the collection process. One of the largest sources of these delays is the time taken to scan the remembered sets, because the sets can be quite large and all references must be scanned.

In some algorithms, remembered set size can be reduced because the collection sets are collected in a fixed order. For example, for reasons related to achieving collection completeness (the property that all garbage is eventually collected), the Train algorithm maintains a total order on regions, and always collects the "oldest" region before younger regions. This order allows a remembered set for a region to only record references from regions younger in the collection order because regions that are older in the collection order will be collected before (or at the same time as) that region.

However since the region collection order may have little or nothing to do with the pattern of references from one region to another, for some programs, region collection ordering may greatly decrease the number of remembered set entries, for other programs the number of entries may not change much at all, and for still other programs region collection ordering may eliminate only some intermediate fraction of the remembered set entries. Further, some collectors do not inherently impose a region collection order on the regions. An example of such a collector is the Garbage First collection algorithm discussed above. In this type of collector advantage cannot be taken of region collection ordering that is already present for another reason.

SUMMARY

In accordance with the principles of the invention, the remembered set for a region is modified to classify reference locations stored therein by the region from which the references originate so that the number of references originating from a given region can be easily determined. If the number of remembered set entries for references from a second region to a first region reaches a predetermined threshold, the second region is constrained so that it will be collected at the same time as, or before, the first region. Then, all entries in the remembered set associated with the first region for references from the second region to the first region can be deleted, and no such entries need be entered in the future, thereby reducing the size of that remembered set and the time required to scan it.

In accordance with one embodiment, if the second region is constrained to be collected before the first region and the number of remembered set entries for references from the first region to the second region also reaches the predetermined threshold, the first and second regions are merged into a single "equivalence" class and collected together in their entirety.

In still another embodiment, the single equivalence class is processed to reduce its size by removing a region, for example, by dirtying all of the cards associated with the region and removing the constraints on that region. The cards can then be rescanned to re-enter references from that region into the remembered sets of the other regions in the class. In cases where the number of references from that region into the other reasons has diminished, this processing can reduce the equivalence class by one region, thereby allowing a smaller class to be collected.

In yet another embodiment, an estimate of live data is recorded for a region when a constraint decision is made and the region is considered for further processing if a later concurrent marking session finds that the active data for that region is actually much smaller than the saved estimate.

In another embodiment, the validity of references is checked before introducing a constraint to insure that the references are still valid when the constraint is imposed. Invalid entries are removed and, if a sufficiently large fraction of the references are invalid, the constraint would not be introduced.

In another embodiment, a count is kept, for each region, of the total number of entries for references from that region contained in the remembered sets of all other regions. If this count becomes sufficiently large then the associated constraint is considered obsolete. Obsolete constraints are checked by removing the constraints and causing the remembered set for the constrained region to be recreated.

DETAILED DESCRIPTION

Figure 1:
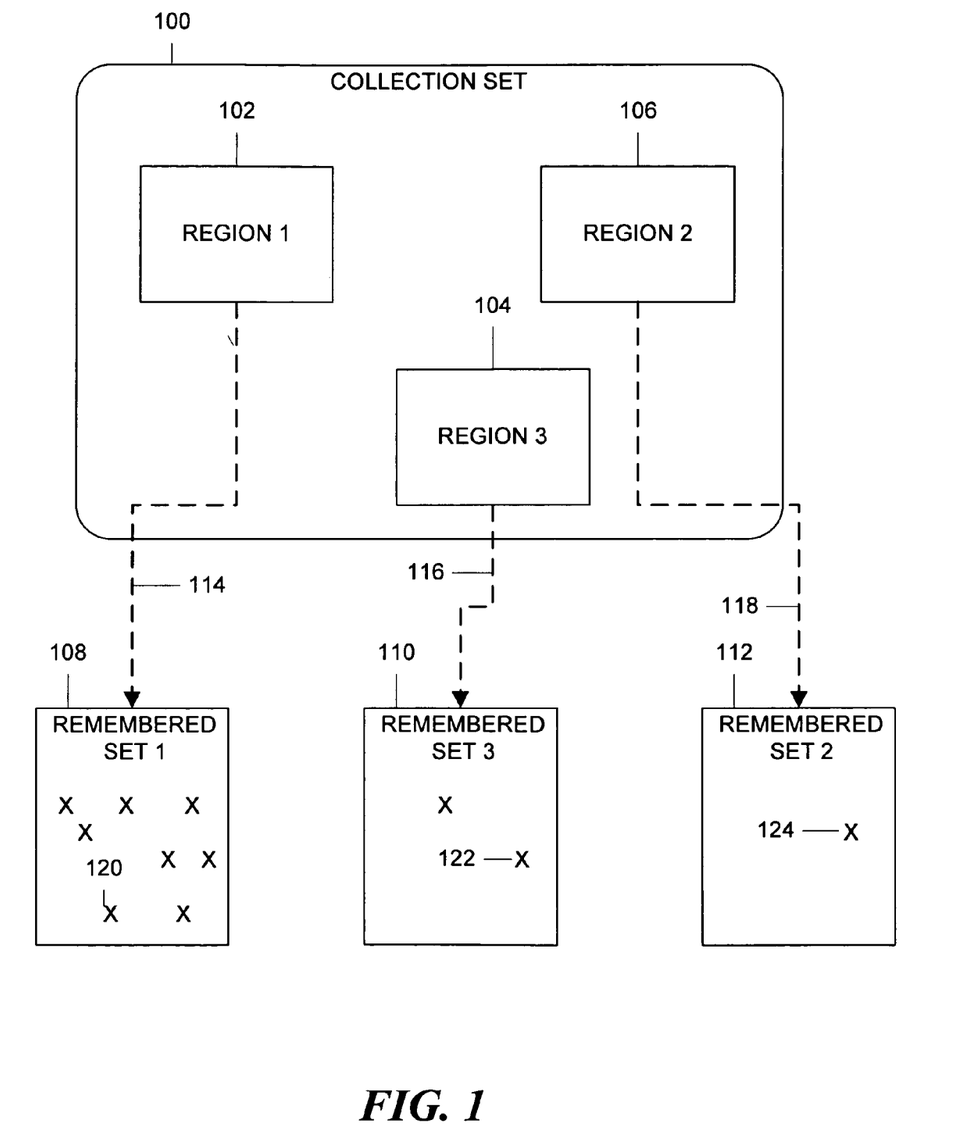
FIG. 1 is a block schematic diagram of a collection set and associated remembered sets that illustrates the relationship of remembered sets to regions in the collection set.

FIG. 1 shows a collection set 100, which as described above, comprises a predefined subset of the heap that will be used by the garbage collector during the collection process. The collection set 100 includes one or more contiguous or noncontiguous regions of which three regions, region 1 (102), region 2 (104) and region 3 (106) are shown in FIG. 1. The nature of regions 102, 104 and 106 depends on the particular collection algorithm employed. For example, if the aforementioned Train algorithm is used as the collector, each of regions 102, 104 and 106 will consist of a fixed-size, contiguous area of memory which is managed by metadata information in a car.

In accordance with certain space incremental collection algorithms discussed above, each region has an associated remembered set data structure. In FIG. 1, remembered sets 108, 110 and 112 are associated with regions 102, 104 and 106, respectively, as illustrated schematically by arrows 114, 116 and 118. For example, when the Train algorithm is used as the collector, each remembered set would either be referenced by, or part of, the metadata information in the car that manages the associated region.

Each remembered set, in turn, includes entries that record the locations of references to objects in the region. For example, in FIG. 1, remembered set 108 includes eight entries including entry 120. Similarly, remembered set 110 includes two entries, such as entry 122. Remembered set 112 includes single entry 124. Those skilled in the art would understand that each remembered set might have no location entries or a large number of entries without affecting the operation of the present invention.

Figure 2:
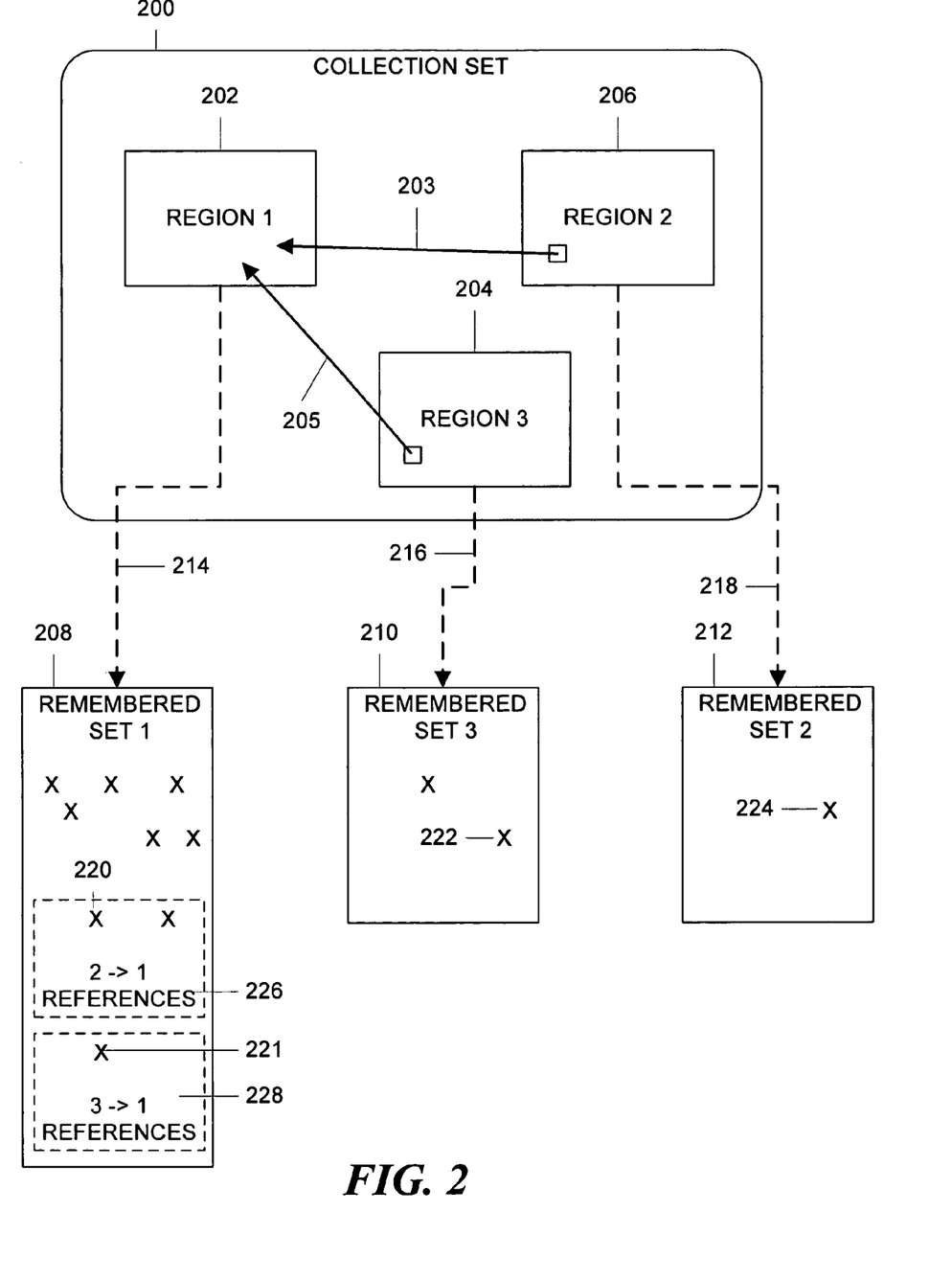
FIG. 2 is a block schematic diagram of a collection set and associated remembered sets that illustrates for region 1 additional data structures that are used to keep track of the region from which a reference to an object in region 1 originates.

In accordance with the invention, references to objects in the region from outside of the region are classified by the region from which the references originate. In this manner, the number of remembered set entries from each other region can be counted. One mechanism for performing this classification is to keep the region origin information in the remembered set along with the memory location information that holds the reference. As shown in FIG. 2, a separate data structure can also be used to represent references from other regions. In FIG. 2, elements that correspond to elements in FIG. 1 have been given corresponding numeral designations. For example, collection set 100 in FIG. 1 corresponds to collection set 200 in FIG. 2. If a separate data structure is used for each other region as shown in FIG. 2, it might be appropriate to use an optimized data structure for small pointer sets. In particular, if the representation for larger sets is optimized for non-interfering parallel update, this may entail space overhead that is unnecessary and avoidable for small sets.

For example, in FIG. 2 a reference 203 may exist from region 2 (206) to an object in region 1 (202.) The memory location holding this reference would normally be recorded in remembered set 1 208 that is associated with region 1 202, for example as entry 220. In accordance with the principles of the invention a separate data structure 226 is also used to record references from region 2 to region 1. This data structure may include information identifying the remembered set entry 220 or other information that identifies the reference 203. In a similar manner, a reference 205 may exist from region 3 (204) to an object in region 1 (202.) The memory location holding this reference would normally be recorded in remembered set 1 208 that is associated with region 1 202, for example as entry 221. In accordance with the principles of the invention a separate data structure 228 is also used to record references from region 3 to region 1 in the same manner as data structure 226. Each of data structures 226 and 228 would normally record a reference count of the number of references recorded in that data structure. Although only two such data structures are shown, a separate data structure would be created for each region containing references that point into region 202. Similar data structures (not shown in FIG. 2) would also be created for remembered sets 210 and 212. The data structures, such as data structures 226 and 228, can be maintained by the same mechanism that maintains remembered set 208. A well-known example of such a mechanism is a conventional write barrier.

If the number of references from region 2 (206) into region 1 (202) reaches some predetermined threshold, then a constraint can be introduced that region 2 is to be collected at the same time as, or before, region 1. This constraint can be written as region 2<=region 1, and designates region 1 as "constrained" by region 2. Although this constraint introduces a region collection ordering, the advantage gained is that all remembered set entries for references from region 2 to region 1, such as entry 220, can be deleted from remembered set 208. In addition, no such entries need be added in the future. As discussed above, if region 2 is collected at the same time as, or before, region 1, then there is no need to track pointers from region 2 to region 1. If region 2 is collected before region 1, live objects in region 2 will be evacuated elsewhere and if these objects contain references to region 1, the references can be recorded in the new object locations during the evacuation.

The threshold that triggers the introduction of a constraint might be based on the space overhead devoted to remembered set entries. An illustrative value might be a worst-case space overhead bound of 50% of the total heap size. For example, in a heap memory with 1024 one MB heap regions, each region would have 1023 hash tables that implement the remembered sets and each hash table would be at most 512 byes in length. This means that the threshold would be set at 128 four-byte entries. Of course, this is a worst-case bound, achieved only when each region has remembered set entries from all other regions, and the number of such entries approaches, but does not exceed, the constraint threshold. In practice, most programs using this system will require much smaller remembered set overhead.

Figure 3:
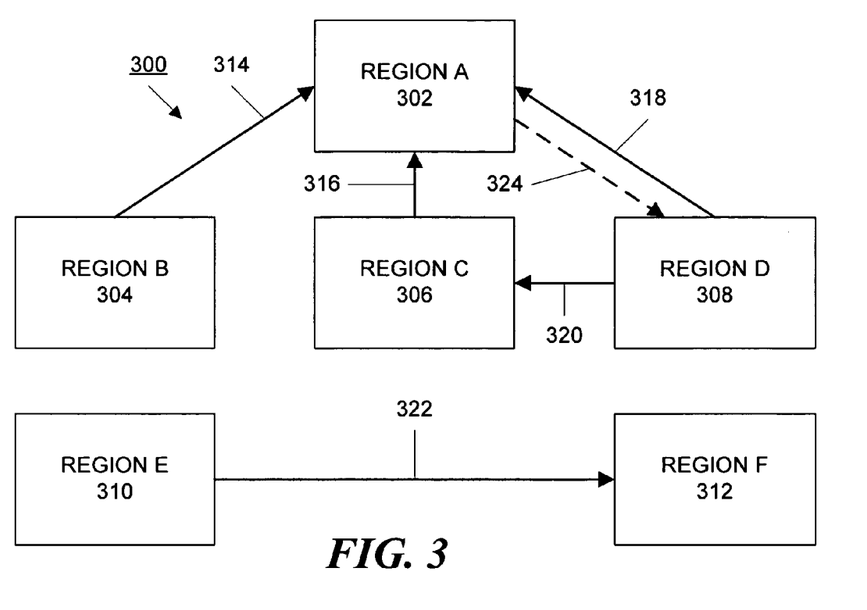
FIG. 3 is a directed graph formed by heap regions that act as nodes and constraints in collection order of the regions.

The collection order constraints between regions form the edges of a graph with regions as nodes. Such a graph 300 is illustrated in FIG. 3. Six regions 302-312 are shown as nodes in the graph 300. The collection order constraints between these regions are represented by arrows 314-322. Thus, region A (302) constrains regions B (304), C (306) and D (308) as indicated by arrows 314, 316 and 318, respectively. Region C (306) constrains region D (308) as indicated by arrow 320 and region F (312) constrains region E (310) as indicated by arrow 322. When regions are chosen for collections, only unconstrained regions are chosen. Thus, in FIG. 3 only regions A (302) and F (312) would be chosen for collection. Choosing a region for the collection set removes it, and all edges for which it is an endpoint, from the constraint graph. For example, if region A (302) is chosen for the collection set, region A (302) and the constraints represented by arrows 314, 316 and 318 would be removed from the graph 300. Since constraints are removed, more regions may become unconstrained and be eligible for collection. For example, If region A (302) and constraint 316 are removed, then region C (306) is unconstrained and will be eligible for collection.

Assuming that the region A constrains region B (A<=B), if the number of entries from region B in the remembered set associated with region A also reaches the predetermined number, then the entries from region B are deleted in the remembered set associated with region A and the constraint that region B must be collected at the same time as, or before, region A is also recorded. This constraint is denoted as B<=A. The combination, A<=B and B<=A, implies that A=B in the collection order. When a constraint is added that creates such an equality, the two regions are merged into a single equivalence class. In the general case, the nodes of the constraint graph represent equivalence classes; regions are initially equivalence classes with a size of one. So while the example we've given merges two equivalence classes, each with a size of one into a class of size two, in general, equivalence classes of sizes x and y would be merged into an equivalence class of size x+y.

Equivalence classes may be represented efficiently by a well-known data structure that designates one member region as the "equivalence class representative", maintains in each region structure a reference to the representative for that class and organizes class member regions into a circular linked list. Determining whether two regions are members of the same equivalence class is simply a test on whether their representatives are the same. Iterating over equivalence class members is just a list traversal. Merging two equivalence classes involves choosing the representative of the larger class as a new representative, and iterating over the regions of the smaller class, setting the representative of each region to that of the larger class. The use of circular linked lists makes creating the list for the merged class a constant-time operation.

Figure 4A:
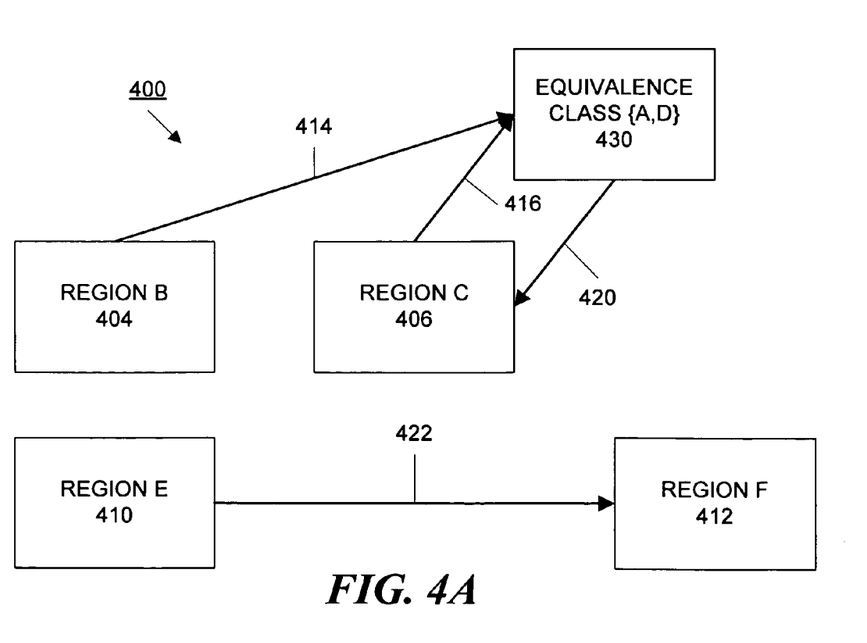
FIGS. 4A and 4B are directed graphs formed by heap regions that act as nodes and constraints in collection order of the regions in regions have been merged into a single class.

For example, in FIG. 3, if a new constraint that region D (308) is constrained by region A (302) is added as indicated by the dotted arrow 324, then regions A and D will be merged in an equivalence class {A,D} (430) as shown in FIG. 4A.

Figure 4B:
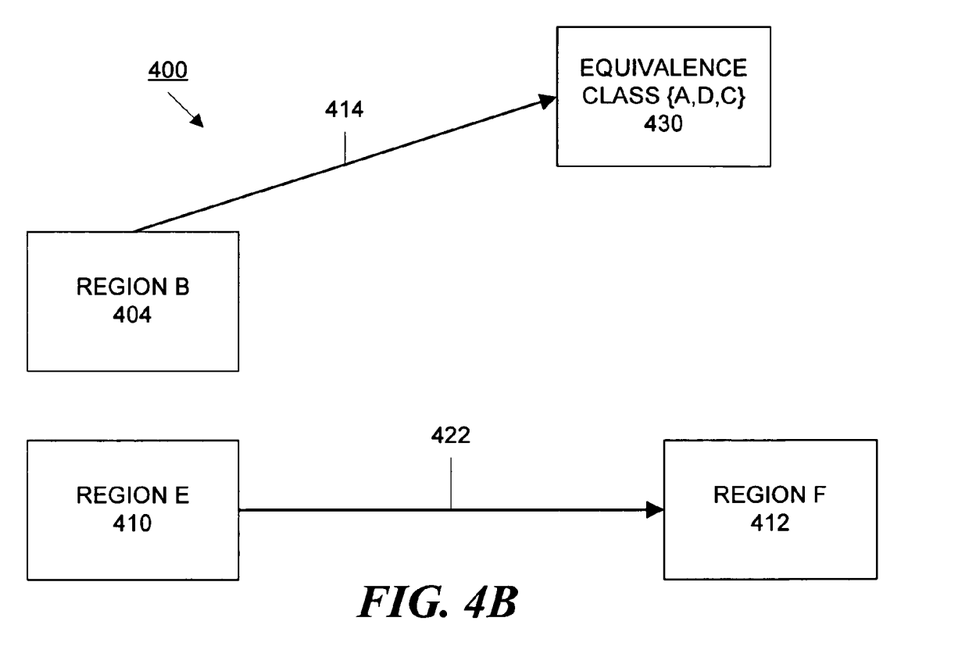

In FIGS. 4A and 4B, elements that are equivalent to those in FIG. 3 have been given equivalent numeral designations. The equivalence class {A,D} (430) inherits all the edges in which the merged nodes participated including edges 414, 416 and 420. It does not include the edges that created the equivalence (318 and 324), which are deleted. If either or both of the nodes being merged are already equivalence classes, the nodes are merged into a larger equivalence class. In the discussion below, the term "node" will be used to denote individual regions and equivalence classes of regions (individual regions can be viewed as equivalence classes of size one.)

After regions A and D have been merged into equivalence class {A,D} 430, additional merges may be necessary. For example, as shown in FIG. 4A, region C (406) now is also a candidate for merging because region C<=equivalence class {A,D} and equivalence class {A,D}<=region C. Thus, region C will then be merged into equivalence class {A,D} to form a new equivalence class {A,D,C} as shown in FIG. 4B.

Constraints may affect the collection order in several ways depending on the collection algorithm in use. In the absence of constraints, regions are chosen for collection based on the particular collection algorithm. For example, with the Garbage First collection algorithm, regions are collected in order of their "expected efficiency." In order to compute expected efficiency, estimates of the benefit (in terms of storage recovered) and cost (in terms of garbage collection time expended) of adding a region to the collection set are maintained. The expected efficiency can be computed as the ratio of these estimates. With this definition, the efficiency of an equivalence class is the aggregate efficiency of collecting all its members. In order to expedite the process of selecting regions for the collection set, the Garbage first algorithm maintains a tree-based efficiency order data structure that lists nodes in sorted efficiency order. When constraints are introduced, this efficiency structure is modified by considering constrained nodes to have an infinite collection cost, thereby causing them to be considered only after unconstrained nodes. If choosing a node for collection removes a constraint on another node, a determination is made if the removed constraint is the last constraint on that node. If it is the last restraint, and the node is now unconstrained, then the estimated collection efficiency of that node is re-evaluated. The node is then deleted from the efficiency order tree, and reinserted in the proper location for its newly-computed unconstrained estimated efficiency.

Additional factors may also be taken into consideration. For example, assume that that a first region constrains several other regions, and that the estimated expected efficiency of the first region is relatively low, but the estimated expected efficiencies of the other regions are relatively high. In this case, the low estimated expected efficiency of the first region will keep it from being chosen thus also keeping the other regions from being chosen. In this case the collection set choice algorithm could be augmented to include not only estimated expected efficiency, but also some component related to the number of regions a given region constrains. This would make it more likely that the first region was chosen for collection in the previous example.

Figure 5:
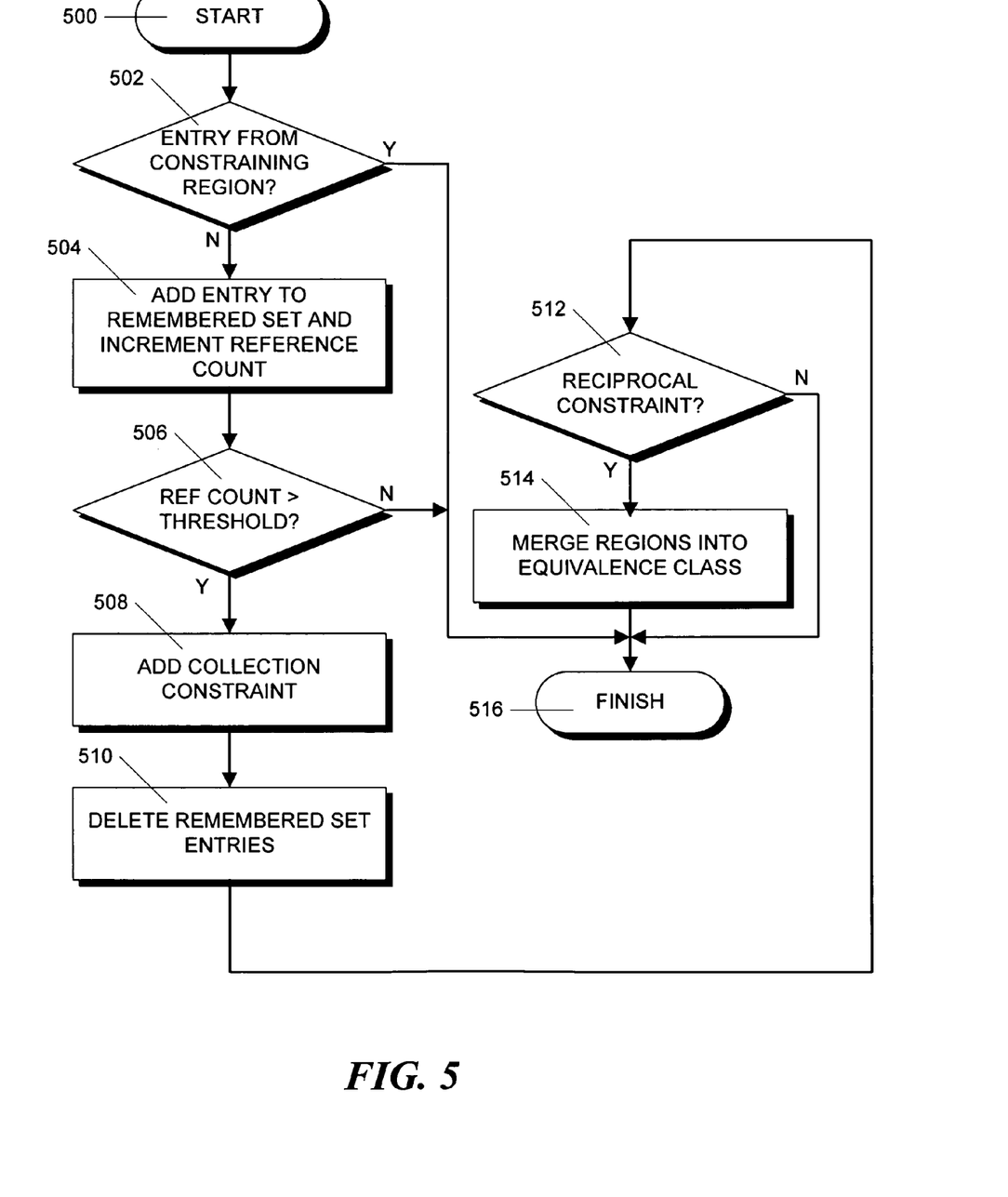
FIG. 5 is a flowchart showing the steps in an illustrative process for processing remembered set entries and adding constraints.

The overall process of processing remembered set entries and adding constraints is illustrated in the flowchart shown in FIG. 5. This process begins in step 500 and proceeds to step 502 where a determination is made whether the entry to be made to the remembered set is from a region that already constrains the current region. If so, the remembered set entry need not be added since the other region will be collected no later than the current region. In this case, the process proceeds to end in step 516.

Alternatively, if, in step 502, it is determined that the reference is from a region that does not constrain the current region, then, in step 504, the reference is added to the remembered set and the appropriate data structure is updated as discussed above and the reference count for the region is updated. Then, in step 506, the updated reference count is compared to the predetermined threshold for imposing constraints. If the new reference count does not exceed the threshold, then the process finishes in step 516.

However, if it is determined in step 506, that the updated reference count does exceed the threshold, then, in step 508, a collection constraint is added so that the other region is collected no later than the current region and the remembered set entries from the constrained region are deleted using the data structure that identified them in step 510.

The process then proceeds to step 512, where a determination is made whether there is a reciprocal constraint (the current region already constrains the other region). If so, the two regions are merged into an equivalence class as described above and the process proceeds to finish in step 516. Alternatively, if there are no reciprocal constraints as determined in step 512, then the process finishes in step 516.

Since the edges that create an equivalence class are deleted, the equivalence class itself may be otherwise unconstrained and may be collected. For example, in FIG. 4, this would be the case if regions E (410) and region F (412) were merged. However, equivalence classes must be added to collection sets and collected in their entirety. This may create problems if equivalence classes grow large. For example, some collectors, such as the aforementioned Garbage First collector, attempt to guarantee a maximum collection interval and meeting this guarantee may be impossible if an equivalence class grows too large.

One way to reduce the size of equivalence classes is to detect obsolete constraints. For example, a constraint may become obsolete if references that caused the constraint to be applied have become obsolete. References may become obsolete for a combination of two reasons. The first is "dead objects": objects in one region that contain references into another region, but have since become unreachable after the reference was recorded in a remembered set. The second is "transient pointers": references in one region that pointed to another region when they were examined by remembered set processing, but have since been updated, and no longer point to that other region.

One method for deleting constraints is by collecting regions that constrain others, thereby eliminating dead objects. For example, heuristic techniques may be used to enhance the criteria used for collection when a region constrains a large number of other regions. In addition, if the garbage collection technique uses concurrent marking, the marking process may indicate that a constraint is obsolete. For example, if an estimate of live data is recorded for a region when a constraint decision is made, a later concurrent marking session may find that the active data for that region is actually much smaller, thereby indicating that the constraint might be obsolete due to dead objects.

One mechanism to deal with transient pointers is to check the validity of references before introducing a constraint to insure that they are still valid when the constraint is imposed. Invalid entries would be removed and if a sufficiently large fraction of the references are invalid, the constraint would not be introduced. Another mechanism involves keeping, for each region, a count of the total number of entries for references from that region contained in the remembered sets of all other regions (using the threshold value or some larger value for regions that the region constrains). If this count becomes sufficiently large for one of the other regions, then it is likely that some non-negligible fraction of these entries must be invalid and any constraint between the region and that other region may be obsolete. This count might also be compared with a count of the number of out-of-region pointers that the region contains when estimating the fraction of invalid entries for this region in other regions' remembered sets. Another, somewhat similar mechanism is to track, for each region, the rate at which cards are dirtied in that region—that is, the mutation rate in that region. If a constraint was introduced sufficiently long ago, and the constrained region has had a relatively high mutation rate, this might be cause to consider the constraint as potentially obsolete.

If there is reason to suspect that a constraint is obsolete, the requirement for the constraint can be re-evaluated by dirtying all cards in the constraining region and deleting the constraint. Normal concurrent remembered set processing would then reconstruct entries in the remembered set for the constrained region. This processing might lead to the constraint being re-introduced if the constraining region still contains many references to the constrained region, but if the number of references has fallen sufficiently, the constraint can be removed. It may also be advantageous to remove more than one region from an equivalence class at a time, if several regions are suspected of participating in obsolete constraints.

A software implementation of the above-described embodiment may comprise a series of computer instructions fixed on a tangible medium, such as a computer readable media, for example, a diskette, a CD-ROM, a ROM memory, or a fixed disk. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices. It is contemplated that such a computer program product may be distributed as a removable media with accompanying printed or electronic documentation, e.g., shrink wrapped software, preloaded with a computer system, e.g., on a system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, in other implementations, different collection algorithms, remembered set data structures and scanning techniques other than those specifically described could be used. The order of the process steps may also be changed without affecting the operation of the invention. Other aspects, such as the specific process flow, as well as other modifications to the inventive concept are intended to be covered by the appended claims.

What is claimed is:

1. A method for reducing remembered set overhead in a generational garbage collector by constraining collection set choice, the method comprising:
    (a) modifying a remembered set for a first heap region to classify reference locations stored as entries therein by heap regions from which the references originate and to maintain a count of remembered set entries originating from each heap region;
    (b) if the number of remembered set entries for references from a second region to the first region reaches a predetermined threshold, constraining the second heap region so that it will be collected at the same time as, or before, the first region;
    (c) when the second heap region is constrained, deleting all entries in the first region remembered set for references from the second region to the first region;
    maintaining a count of the total number of entries in a region contained in the remembered sets of all other regions; and
    when the count exceeds a predetermined count, removing any constraint between the region and the other regions and causing the remembered sets for the constrained regions to be recreated.

2. The method of claim 1 further comprising:
    (d) when the second heap region is constrained, controlling the remembered set so that no further entries are entered for references from the second region to the first region.

3. The method of claim 1 further comprising:
    (e) if the number of remembered set entries for references from the second region to the first region reaches a predetermined threshold and the number of remembered set entries for references from the first region to the second region reaches the predetermined threshold, merging the first and second regions into a single equivalence class that is collected in its entirety.

4. The method of claim 3 further comprising:
    (f) processing the equivalence class to reduce its size by removing one or more regions from the equivalence class, re-examining objects in the removed regions for references into other regions and re-inserting current reference locations into the remembered sets of those other regions.

5. The method of claim 1 wherein step (b) comprises:
    recording an estimate of live data for a heap region when a constraint decision is made; and the method further comprises:
    (d) further processing the constrained region by removing the constraint, reexamining objects in the region for references into other regions and reinserting current reference locations into the remembered sets of those other regions if a later concurrent marking session finds that the active data for that region is below a predetermined percentage of the size of the saved estimate.

6. The method of claim 1 wherein step (b) comprises:
    (b1) checking the validity of references before introducing a constraint to insure that the references are still valid when the constraint is imposed;
    (b2) removing invalid entries; and
    (b3) if more than a predetermined fraction of the references are invalid, not introducing the constraint.

7. The method of claim 1 wherein step (a) comprises associating a separate data structure with the remembered set to store information identifying a heap region from which each remembered set entry originates.

8. The method of claim 7 wherein the separate data structure comprises a data structure for each heap region from which references originate.

9. The method of claim 7 wherein step (c) comprises using the separate data structure to identify remembered set entries for deletion.

10. Apparatus for reducing remembered set overhead in a generational garbage collector by constraining collection set choice, the apparatus comprising:
    a mechanism that modifies a remembered set for a first heap region to classify reference locations stored as entries therein by heap regions from which the references originate and that maintains a count of remembered set entries originating from each heap region;
    a mechanism that, when a number of remembered set entries for references from a second heap region to the first heap region reaches a predetermined threshold, constrains the second heap region so that it will be collected at the same time as, or before, the first heap region; and
    a mechanism that, when the second heap region is constrained, deletes all entries in the first region remembered set for references from the second heap region to the first heap region;
    a mechanism that maintains a count of a total number of entries in a region contained in the remembered sets of all other regions; and
    a mechanism that, when the count exceeds a predetermined count, removes any constraint between the region and the other regions and causes the remembered sets for the constrained regions to be recreated.

11. The apparatus of claim 10 further comprising:
a mechanism, operable when the second heap region is constrained, that controls the remembered set so that no further entries are entered for references from the second region to the first region.

12. The apparatus of claim 10 further comprising:
a mechanism, operable if the number of remembered set entries for references from the second region to the first region reaches a predetermined threshold and the number of remembered set entries for references from the first region to the second region reaches the predetermined threshold, that merges the first and second regions into a single equivalence class that is collected in its entirety.

13. The apparatus of claim 12 further comprising:
a mechanism that processes the equivalence class to reduce its size by removing one or more regions from the equivalence class, re-examining objects in the removed regions for references into other regions and re-inserting current reference locations into the remembered sets of those other regions.

14. The apparatus of claim 10 wherein the mechanism that constrains the second heap region comprises a mechanism that records an estimate of live data for a heap region when a constraint decision is made; and the apparatus further comprises:
a mechanism that further processes the constrained region by removing the constraint, re-examining objects in the region for references into other regions and re-inserting current reference locations into the remembered sets of those other regions if a later concurrent marking session finds that the active data for that region is below a predetermined percentage of the size of the saved estimate.

15. The apparatus of claim 10 wherein the mechanism that constrains the second heap region comprises:
a mechanism that checks the validity of references before introducing a constraint to insure that the references are still valid when the constraint is imposed;
a mechanism that removes invalid entries; and
a mechanism, operable if more than a predetermined fraction of the references are invalid, that prevents the constraint from being introduced.

16. The apparatus of claim 10 wherein the mechanism that modifies a remembered set for a first heap region and maintains a count of remembered set entries comprises a mechanism that associates a separate data structure with the remembered set to store information identifying a heap region from which each remembered set entry originates.

17. The apparatus of claim 16 wherein the separate data structure comprises a data structure for each heap region from which references originate.

18. The apparatus of claim 16 wherein the mechanism that deletes all entries in the first region remembered set for references from the second region to the first region comprises a mechanism that uses the separate data structure to identify remembered set entries for deletion.

19. Apparatus for reducing remembered set overhead in a generational garbage collector by constraining collection set choice, the apparatus comprising:
means for modifying a remembered set for a first heap region to classify reference locations stored as entries therein by heap regions from which the references originate and to maintain a count of remembered set entries originating from each heap region;
means for constraining a second heap region so that it will be collected at the same time as, or before, the first heap region when a number of remembered set entries for references from the second heap region to the first heap region reaches a predetermined threshold;
means for deleting all entries in the first region remembered set for references from the second heap region to the first heap region when the second heap region is constrained;
means for maintaining a count of a total number of entries in a region contained in the remembered sets of all other regions; and
means for removing any constraint between the region and the other regions and causing the remembered sets for the constrained regions to be recreated when the count exceeds a predetermined count.

20. The apparatus of claim 19 further comprising:
means, operable when the second heap region is constrained, for controlling the remembered set so that no further entries are entered for references from the second region to the first region.

21. The apparatus of claim 19 further comprising:
means, operable if the number of remembered set entries for references from the second region to the first region reaches a predetermined threshold and the number of remembered set entries for references from the first region to the second region reaches the predetermined threshold, for merging the first and second regions into a single equivalence class that is collected in its entirety.

22. The apparatus of claim 21 further comprising:
means for processing the equivalence class to reduce its size by removing one or more regions from the equivalence class, re-examining objects in the removed regions for references into other regions and re-inserting current reference locations into the remembered sets of those other regions.

23. A computer program product for reducing remembered set overhead in a generational garbage collector by constraining collection set choice, the computer program product comprising a computer readable medium having computer readable program code thereon, including:
program code for modifying a remembered set for a first heap region to classify reference locations stored as entries therein by heap regions from which the references originate and to maintain a count of remembered set entries originating from each heap region;
program code for constraining the second heap region so that it will be collected at the same time as, or before, the first heap region when a number of remembered set entries for references from the second heap region to the first heap region reaches a predetermined threshold; and
program code for deleting all entries in the first region remembered set for references from the second heap region to the first heap region when the second heap region is constrained;
program code for maintaining a count of a total number of entries in a region contained in the remembered sets of all other regions; and
program code for removing any constraint between the region and the other regions and causing the remembered sets for the constrained regions to be recreated when the count exceeds a predetermined count.

* * * * *